(12) United States Patent
Chen et al.

(10) Patent No.: US 9,774,994 B2
(45) Date of Patent: Sep. 26, 2017

(54) SYSTEM AND METHOD FOR MONITORING DEVICES RELATIVE TO A USER DEFINED GEOGRAPHIC AREA

(71) Applicant: Aeris Communications, Inc., Santa Clara, CA (US)

(72) Inventors: Yixiang Chen, Palo Alto, CA (US);
Fumito Kayama, Pacifica, CA (US);
Santosh Astagi, San Mateo, CA (US);
Drew S. Johnson, San Jose, CA (US)

(73) Assignee: Aeris Communications, Inc., Santa Clara, CA (US)

( * ) Notice: Subject to any disclaimer, the term of this patent is extended or adjusted under 35 U.S.C. 154(b) by 0 days.

(21) Appl. No.: 15/234,463

(22) Filed: Aug. 11, 2016

(65) Prior Publication Data
US 2017/0048669 A1     Feb. 16, 2017

Related U.S. Application Data

(60) Provisional application No. 62/205,639, filed on Aug. 14, 2015.

(51) Int. Cl.
*H04W 68/00* (2009.01)
*H04W 4/02* (2009.01)
*H04L 29/08* (2006.01)
*H04W 4/00* (2009.01)

(52) U.S. Cl.
CPC .............. *H04W 4/021* (2013.01); *H04L 67/02* (2013.01); *H04W 4/005* (2013.01)

(58) Field of Classification Search
CPC ...... H04W 4/021; H04W 4/005; H04L 67/10; H04L 67/02

USPC ............ 455/404.2, 412.1–414.2, 418–422.1, 455/41.1–41.2, 552.1, 556.1, 456.1–456.3, 455/456.5–457

See application file for complete search history.

(56) References Cited

U.S. PATENT DOCUMENTS

| | | | |
|---|---|---|---|
| 6,687,356 B1* | 2/2004 | Glitho | H04L 12/6418 370/215 |
| 7,213,048 B1* | 5/2007 | Parupudi | G06F 17/30241 455/456.1 |
| 7,801,538 B2* | 9/2010 | Weiser | H04W 4/06 370/312 |
| 8,018,329 B2* | 9/2011 | Morgan | B60R 25/04 340/426.18 |

(Continued)

OTHER PUBLICATIONS

International Search Report and Written Opinion from International Application No. PCT/US16/46924 mailed Oct. 28, 2016.

*Primary Examiner* — Babar Sarwar
(74) *Attorney, Agent, or Firm* — Brundidge & Stanger, P.C.

(57) ABSTRACT

The present invention relates generally to providing a system and method for monitoring devices relative to a user defined geographic area using an enablement platform for building web sites and web applications using data storage, management and publication capabilities of hosted web services. The system and method for monitoring M2M devices relative to a user defined geographic area (geofence) are built on existing AerCloud concepts by allowing user to define location attributes and by using the user defined location attributes to configure and evaluate geofence parameters and issue alerts if the devices are performing outside the geofence parameters.

20 Claims, 12 Drawing Sheets

Geofence Workflow

(56) References Cited

U.S. PATENT DOCUMENTS

| | | | | |
|---|---|---|---|---|
| 8,346,230 | B2* | 1/2013 | Goodmon | H04H 60/51 |
| | | | | 455/414.3 |
| 8,593,277 | B2* | 11/2013 | Nath | G01S 5/0252 |
| | | | | 340/539.13 |
| 2004/0193617 | A1* | 9/2004 | Adler | G08B 27/005 |
| 2007/0143013 | A1* | 6/2007 | Breen | G01S 5/0027 |
| | | | | 701/32.3 |
| 2009/0275348 | A1* | 11/2009 | Weinreich | G01S 5/0036 |
| | | | | 455/456.3 |
| 2010/0075648 | A1* | 3/2010 | Matsuoka | H04M 1/72566 |
| | | | | 455/418 |
| 2012/0058764 | A1* | 3/2012 | Kang | H04W 60/02 |
| | | | | 455/435.1 |
| 2013/0212130 | A1* | 8/2013 | Rahnama | G06F 17/30002 |
| | | | | 707/792 |
| 2015/0012908 | A1* | 1/2015 | Farooqi | G06F 8/34 |
| | | | | 717/107 |

* cited by examiner

Figure 7

An example of data structure that is sent to AerCloud.

```
"rule": {
"assumptions": [{"parameter": "speedKmHr", "op": ">", "value": "100"}],
"actionType": "NOTIFY",
"geofence": {
"eventType": "INSIDE",
"areas": {
"type": "FeatureCollection",
"features": [
{
"type": "Feature",
"properties": {
"areaId": "areaId_0"
},
"geometry": {
"type": "Polygon",
"coordinates": [
[-122.39456176757811, 37.97559752809 1235],
},
{
"type": "Feature",
"properties": {
"areaId": "areaId_1",
"radius": "13665.473381915877"
},
"geometry": {
"type": "Point",
"coordinates": [-122.01004028320312, 37.94203148678865]
```

Geofence Workflow

Figure 9
Geofence Configuration

Example:
```
{
    "geofence": {
        "eventType": "INSIDE",
        "areas": {
            "type": "FeatureCollection",
            "features": [
                {
                    "type": "Feature",
                    "properties": {
                        "radius": "1000",
                        "areaId": "1"
                    },
                    "geometry": {
                        "type": "Point",
                        "coordinates": [
                            -121.966842,
                            37.387096
                        ]
                    }
                }
            ]
        }
    }
}
```

- A geofence can contain multiple geographical areas but each area must be a valid GeoJSON object.

| Parameter Name | Description |
|---|---|
| EventType | INSIDE or OUTSIDE |
| Areas | A GeoJSON Feature Collection object. |

- Required GeoJSON Properties
  - "areaId" – Is used for notifying INSIDE event type.
  - "radius" – Required if the object type is Point. Its value is the radius of a circle in meters.

Figure 10

Evaluating a Geofence

| Event Type | Trigger Criteria | Trigger |
|---|---|---|
| INSIDE | The geofence rule is "true" if a device location is within any area defined in the fence. "False" otherwise | Device data is sent to an application only if the geofence rule is evaluated to true. The data is decorated with the "area id" that triggered the fence |
| OUTSIDE | The geofence rule is "true" if a device location is outside all area defined in the fence. "False" otherwise | Device data is sent to the application only if the geofence rule is evaluated to true. |

Figure 11

User Defined Location Attributes

| Presented Items | Description |
|---|---|
| normalizedProperty | • "LOC_LAT" - Indicates that this data model parameter designates latitude. Default is "latitude".<br>• "LOC_LON" - Indicates that this data model parameter designates longitude. Default is "longitude".<br>• "LOC_ALT" - Indicates that this data model parameter designates altitude. Default is "altitude". |

- Normalizing the data model definition using the "metadata" field.

SYSTEM AND METHOD FOR MONITORING DEVICES RELATIVE TO A USER DEFINED GEOGRAPHIC AREA

CROSS-REFERENCE TO RELATED APPLICATION

This application claims priority to U.S. Provisional Application No.: 62/205,639, filed Aug. 14, 2015, which is incorporated herein by reference in its entirety; and is related to U.S. patent application Ser. No. 15/234,493, filed on Aug. 11, 2016, entitled "AERCLOUD APPLICATION EXPRESS AND AERCLOUD APPLICATION EXPRESS LAUNCHER" which is incorporated herein by reference in its entirety.

FIELD OF THE INVENTION

The present invention relates generally to providing a system and method for monitoring devices relative to a user defined geographic area using an enablement platform for building web sites and web applications using data storage, management and publication capabilities of hosted web services.

BACKGROUND

With the explosion of the Internet of Things (IoT) and the number of devices connected over internet and wireless communications and generating data for use in user-defined applications, it has become more and more important to enable users to easily build web-based applications that allow use of this generated data for meaningful purposes, such as real time monitoring of and interaction with Machine to Machine (M2M) services devices and services within a communication infrastructure.

An application for monitoring M2M devices may want to know if a device location is within or outside a geographical boundary and/or access other data regarding that device. For example, an application may want to know if a delivery truck has left its depot or has arrived at its designated next stop at certain time or speed of that truck at a particular time.

Accordingly, what is needed is a system and method to address the issue of real time monitoring of M2M devices. The present invention addresses such a need.

SUMMARY

The present invention relates generally to providing a system and method for monitoring devices relative to a user defined geographic area using an enablement platform for building web sites and web applications using data storage, management and publication capabilities of hosted web services. The system and method for monitoring devices relative to a user defined geographic area (geofence) are built on existing AerCloud concepts by allowing user to define location attributes and by using the user defined location attributes to configure and evaluate geofence parameters and issue alerts if the devices are performing outside the geofence parameters.

BRIEF DESCRIPTION OF THE DRAWINGS

FIG. 7 illustrates an example of data structure that is sent to AerCloud according to an embodiment of the present invention.

FIG. 9 illustrates an example of Geofence configuration according to an embodiment of the present invention.

FIG. 10 illustrates an example of criteria for evaluating a Geofence according to an embodiment of the present invention.

FIG. 11 illustrates an example of user defined location attributes according to an embodiment of the present invention.

DETAILED DESCRIPTION

Figure 1:
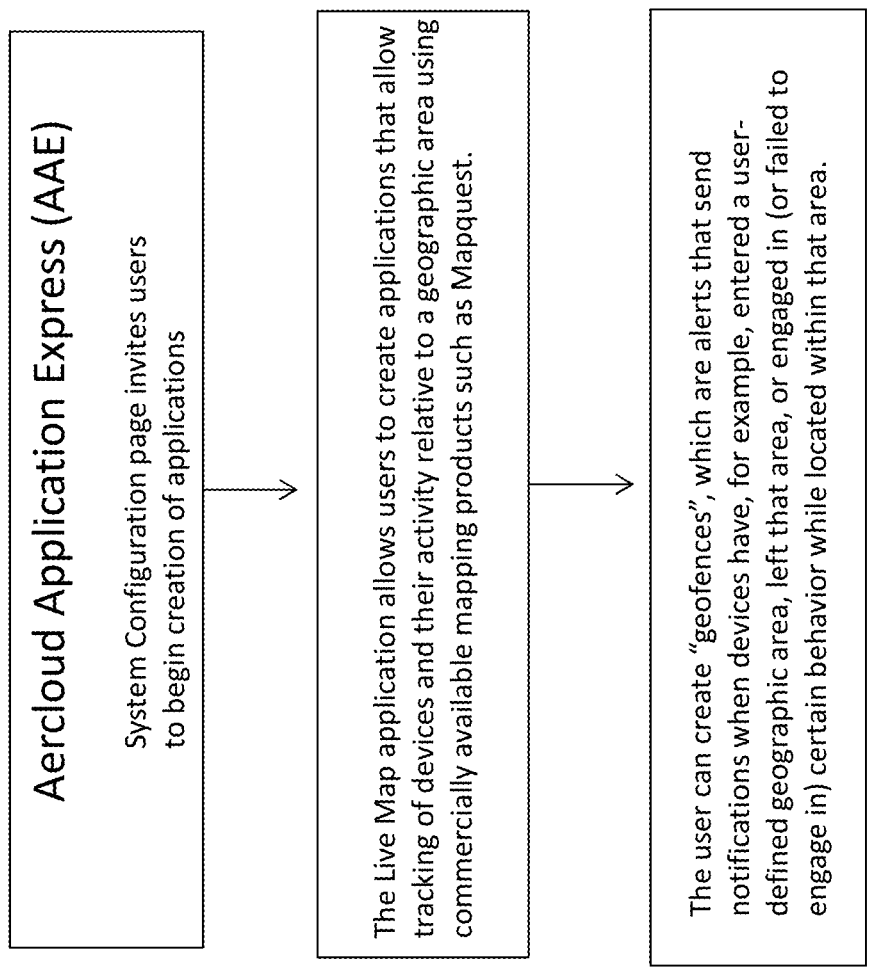
FIG. 1 is a diagram illustrating various steps involved in creating a new instance for development of web sites and web applications and creation of applications using an enablement platform according to an embodiment of the present invention.

The present invention relates generally to providing a system and method monitoring devices relative to a user defined geographic area using an enablement platform for building web sites and web applications using data storage, management and publication capabilities of hosted web services.

The following description is presented to enable one of ordinary skill in the art to make and use the invention and is provided in the context of a patent application and its requirements. Various modifications to the preferred embodiments and the generic principles and features described herein will be readily apparent to those skilled in the art. Thus, the present invention is not intended to be limited to the embodiments shown, but is to be accorded the widest scope consistent with the principles and features described herein.

Machine to machine (M2M) network communications involves technologies to communicate with other devices often of similar abilities, different from traditional cellular communication networks for instance. In basic M2M environments, a device having limited logic (such as a sensor, meter, etc.) and limited resources (such as computing power) is resident at a location to typically captured measurable event data (such as temperature, pressure, quantity, etc.). The device is connected through a communications network to a remote computer or server having an application layer of specific software. The data received from the device is converted to relevant information associated with the measured event data through the application and may often thereafter undergo analysis or further similar assessment. In many cases a device, when activated, may trigger and communicate the events it is intended for so that those communicated events will then be acted upon by other machines, applications, and/or users on the network.

M2M environments often involve systems of networks, wired and wireless, that are to be connected to the internet and include personal appliances and similar devices. In M2M networks, typically devices may stationary or mobile and be connected via wired or wireless access protocols, often through WiFi network protocols or a 3GPP Mobile network protocol. These devices may also have seasonal and/or elastic connectivity needs (e.g., agricultural business needs, store and forward capability). Often in busy M2M networks, there is an 'always on' device being used such as a general packet radio services (GPRS) or internet gateway. However, M2M communication infrastructure remains most suited to the communication needs and patterns of devices having similar abilities, characteristically, for communicating with other systems and devices on the same network.

An application for monitoring M2M devices may want to know if a device location is within or outside a geographical boundary and/or access other data regarding that device. For example, an application may want to know if a delivery truck has left its depot or has arrived at its designated next stop at certain time or speed of that truck at a particular time. This can be difficult due to limited logic as well as limited resources available to an M2M device.

Although a system and method in accordance with the present invention is described with respect to an application for monitoring devices relative to an user defined geographic area using an enablement platform for building web sites and web applications using data storage, management and publication capabilities of hosted web services, in M2M domain, as used herein the term "application" is intended to be inclusive, interchangeable, and/or synonymous with other similar applications as described further below, though one will recognize that functionally different types of applications may have characteristics, functions and/or operations which may be specific to their individual capabilities and/or deployment.

The present invention provides a system and method for monitoring devices relative to an user defined geographic area using an enablement platform which enables setting up new instances by collecting the required information from the user and feeding it to the necessary pages of the Hosted Data Service (HDS) in the background and developing production-ready M2M applications, using data storage, management and publication capabilities of hosted web services by providing easy-to-use software tools or widgets provided on an "out of the box" basis and an Application Programming Interface (API) that interacts with the instance at the HDS.

The enablement platform hereinafter is referred to as AerCloud Application Express (AAE) Launcher and AAE, where AAE Launcher is used with a data management and publication service. Aercloud Application Express (AAE) is an application which is used to create new applications for use of data from M2M devices. This is an application running at a website that uses a simple interface (the Aercloud Application Express User Interface, or AAE UI) to help users who already have an instance at a HDS that can receive device data to develop production-ready M2M applications using easy-to-use software tools (widgets) provided on an "out of the box" basis and an Application Programming Interface (API) that interacts with the instance at the HDS. Once the user has used AAE Launcher to create a new instance for an application using Aeris AerCloud data management and publication service, the user is able to quickly develop production-ready M2M applications using AerCloud API and widgets provided on an "out of the box" basis at the AAE UI using AAE.

One such widget "Geofence" provides a system and method for creating user defined geographic area using an enablement platform for building web sites and web applications using data storage and management capabilities of web services. Geofence is built on existing AerCloud concepts by allowing user to define location attributes and by using the user defined location attributes to configure and evaluate geofence as described below.

System Configuration page invites users to begin creation of applications via Aercloud Application Express, first by entering their user credentials for their AerCloud account and, if applicable, a key for incorporating maps provided by commercially available mapping products into applications that use a map. Next, "The Live Map" application widget allows users to create applications that allow tracking of devices and their activity relative to a geographic area using commercially available mapping products.

This is achieved by creating "geofences", which are alerts that send notifications when devices have, for example, entered a user-defined geographic area, left that area, or engaged in (or failed to engage in) certain behavior while located within that area. The invention simplifies the method provided by mapping products for defining the boundaries of the geofence using the drawing tool and provides superior flexibility for setting alerts based on device behavior (such as which devices inside the geofence are behaving outside permitted parameters).

Creation and use of this application includes creating a new alert, seeing all the existing alerts, seeing the detail of the alert in a draggable overlay widget. In the draggable overlay widget, the user is permitted to: enter criteria for a new alert, update the selected alert, delete the selected alert and/or enter name of the alert.

While doing so, the user is permitted to select a shape for geo-fence, click the Add button in the select a geo-fence shape view to enable geo-fence drawing mode using the simplified tool. Other operations for issuing an alert based on user defined geographic area "geofence" included in the widget are, for example,: 1. See an instruction of what to do while in the geo-fence mode in a green popup. i.e. "Click and drag the mouse on the map to draw a circle." 2. Remove the geo-fence you have just drawn 3. Set whether the alert should be executed when the device is inside of the geo-fence or outside of the geo-fence, 4. Set a condition with parameters retrieved from AerCloud 5. Inline create an existing condition 6. Inline delete an existing condition.

To describe the features of the present invention in more detail within the context of monitoring devices relative to a user defined geographic area "geofence" and for issuing alerts, refer to the accompanying figures in conjunction with the following discussions. These examples are used for purpose of illustration only, and should not be construed as limitations.

FIG. 1 is a diagram illustrating various steps involved in creation of application using an enablement platform according to an embodiment of the present invention. First, a user signs in Aercloud Application Express (AAE) using a valid user name and password. System Configuration page then invites the user to begin creation of applications. The Live Map application allows users to create applications that allow tracking of devices and their activity relative to a geographic area using commercially available mapping products. The user can then create "geofences", which are alerts that send notifications when devices have, for example, entered a user-defined geographic area, left that area, or engaged in (or failed to engage in) certain behavior while located within that area.

Figure 2:
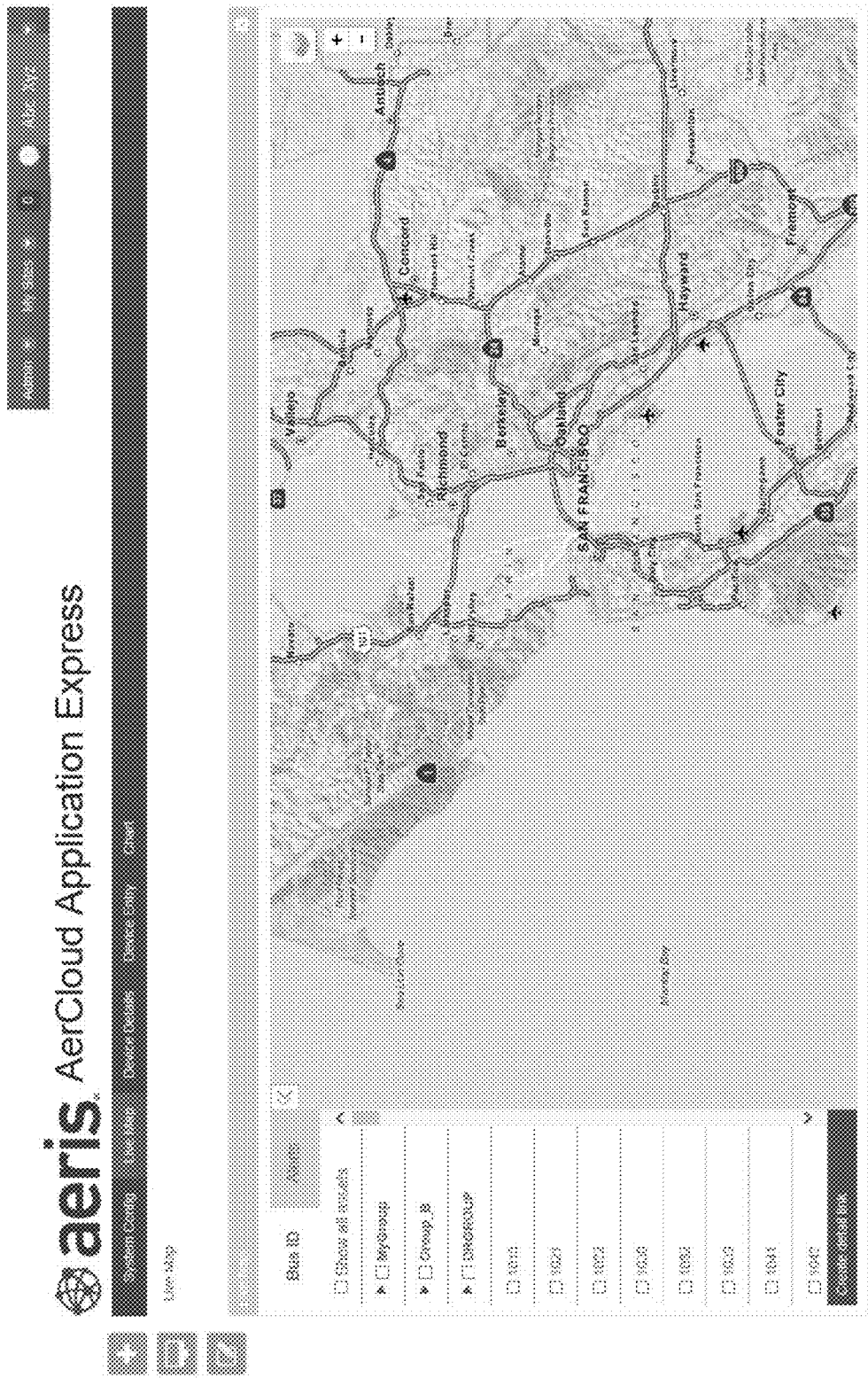
FIG. 2 is a diagram illustrating "Live Map", a widget provided by Application Express allowing users to create applications for tracking of devices and their activity relative to a geographic area using commercially available mapping products according to an embodiment of the present invention.

FIG. 2 is a diagram illustrating "Live Map", a widget provided by Application Express allowing users to create applications for tracking of devices and their activity relative to a geographic area using commercially available mapping products according to an embodiment of the present invention.

Figure 3:
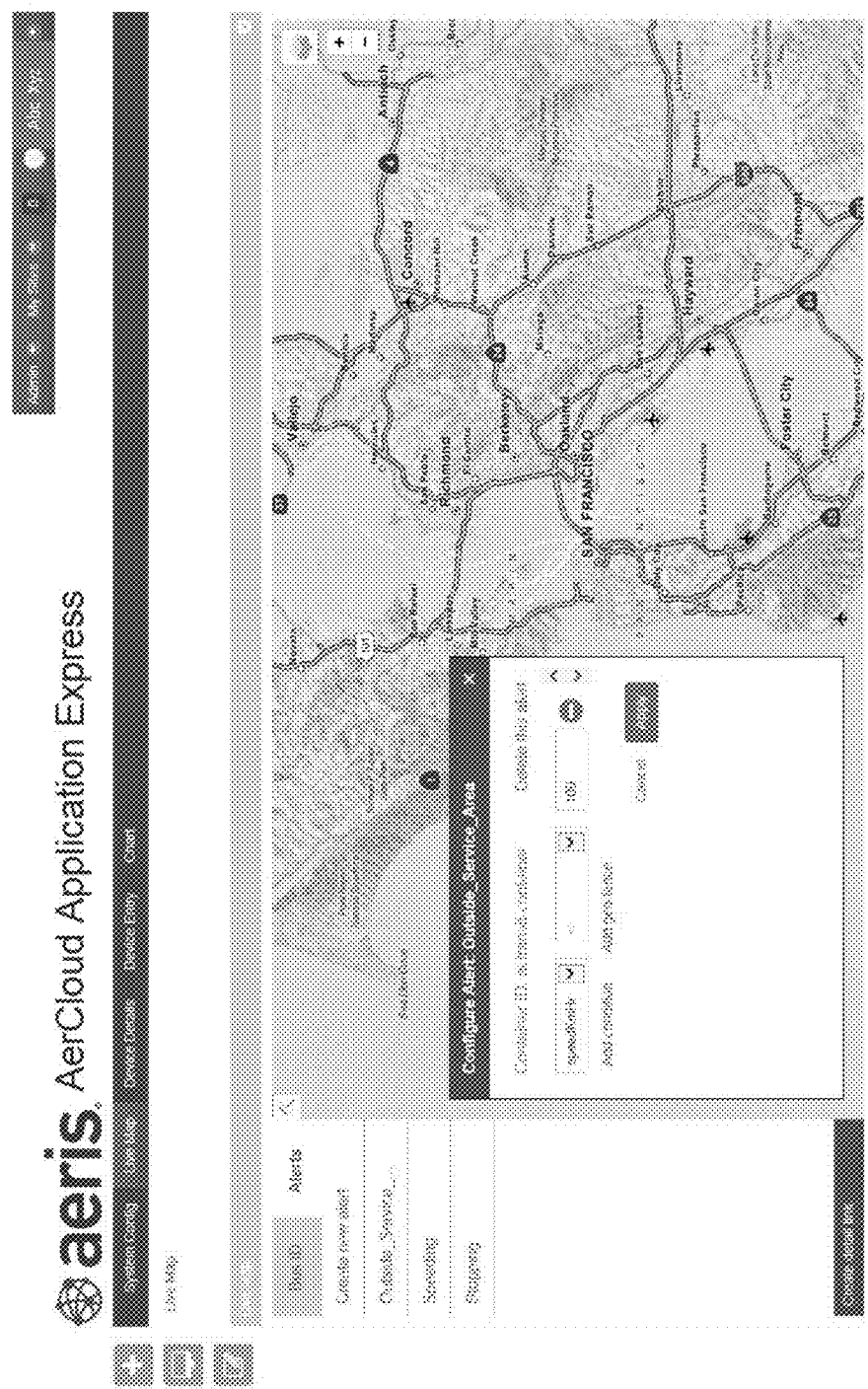
FIG. 3 is a diagram illustrating "Live Map", a widget provided by Application Express allowing users to configure alerts according to an embodiment of the present invention.

FIG. 3 is a diagram illustrating "Live Map", a widget provided by Application Express allowing users to configure alerts according to an embodiment of the present invention.

Figure 4:
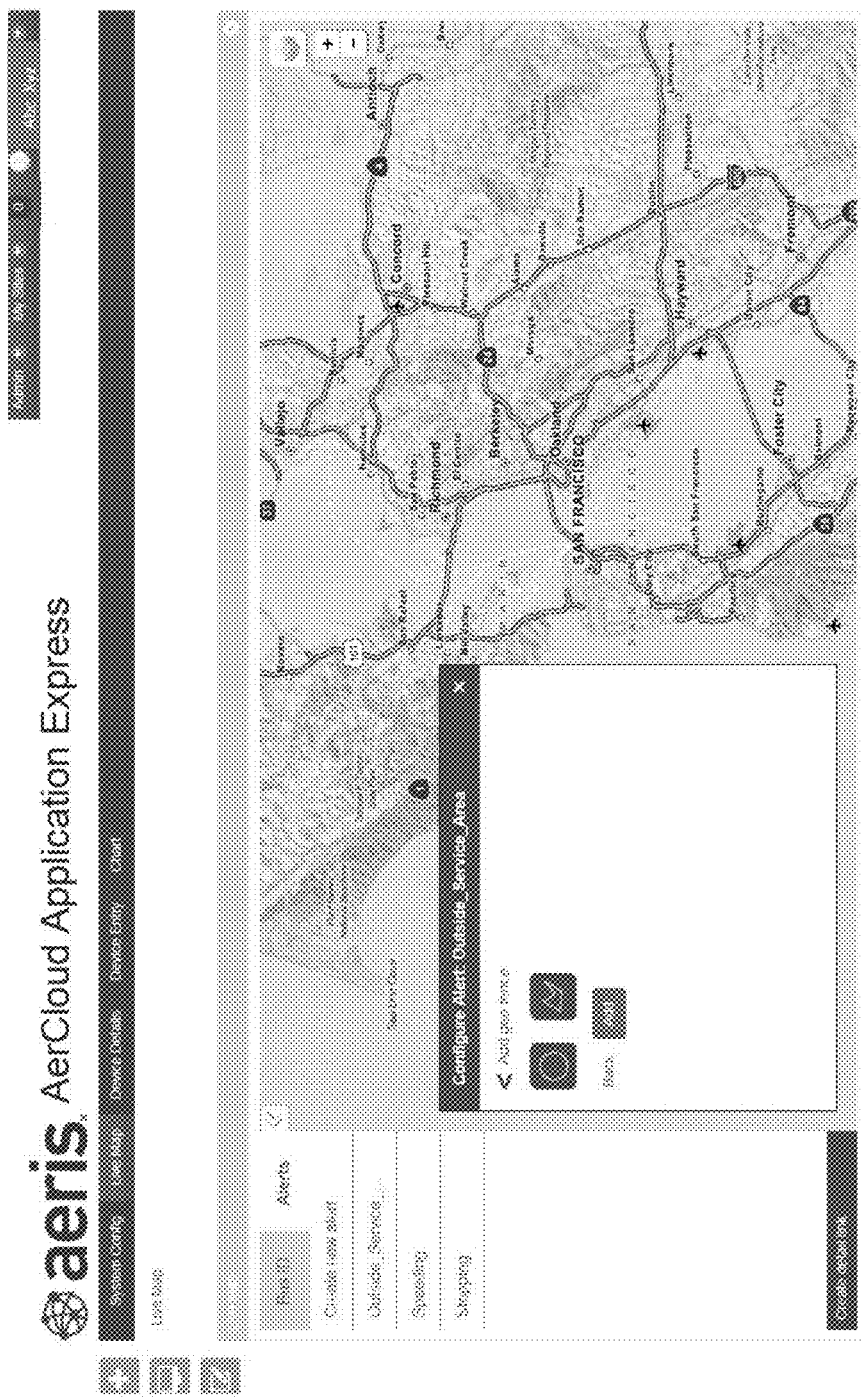
FIG. 4 is a diagram illustrating "Live Map", a widget provided by Application Express allowing users to configure alerts by adding "geofence" according to an embodiment of the present invention.

FIG. 4 is a diagram illustrating "Live Map", a widget provided by Application Express allowing users to configure alerts by adding "geofence" according to an embodiment of the present invention.

Figure 5:
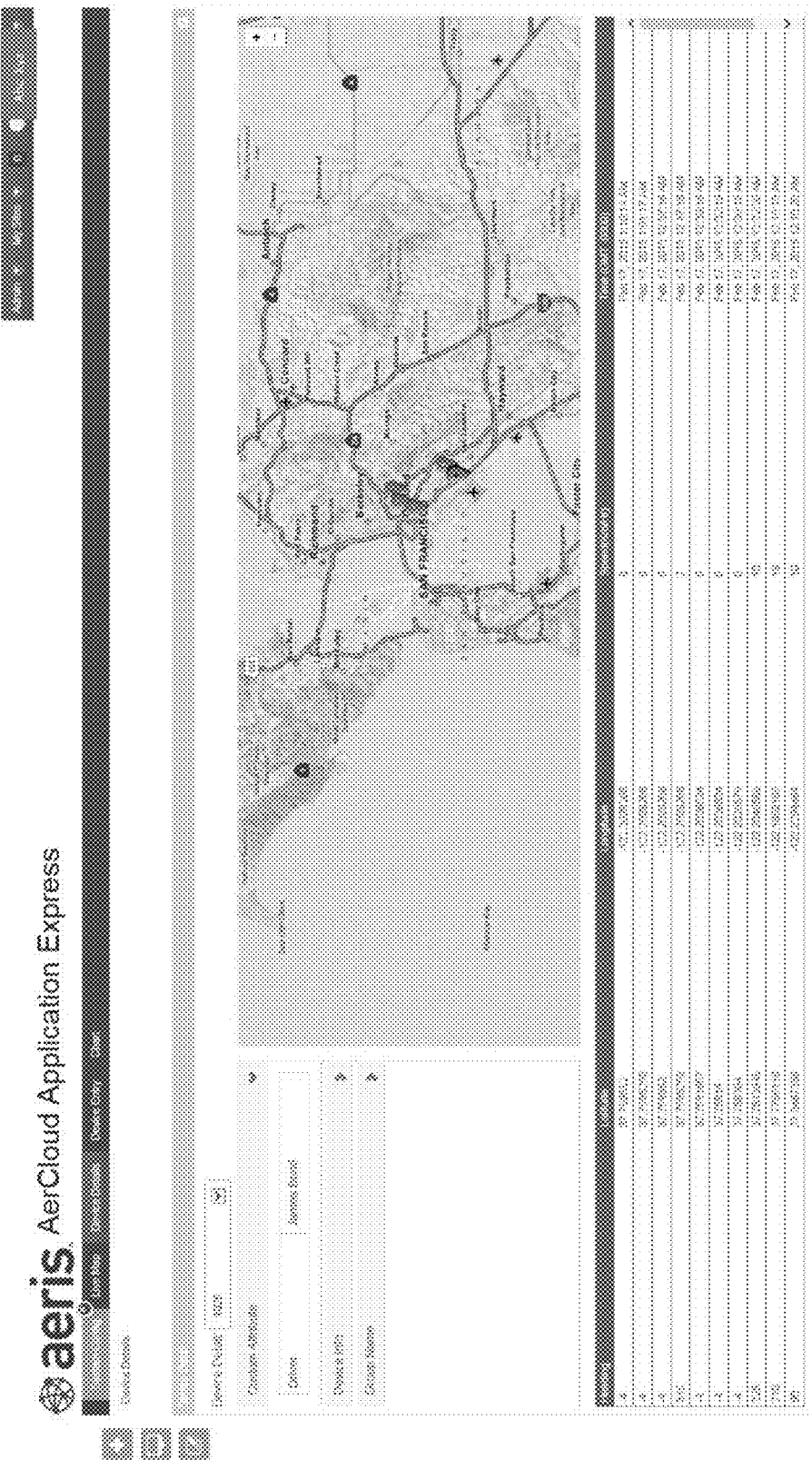
FIG. 5 is a diagram illustrating "Device Entry" a widget provided by Application Express and its interaction with "Device Details" widget illustrating types of location data returned by the Live Map and "Chart" application widgets according to an embodiment of the present invention.

FIG. 5 is a diagram illustrating "Device Entry" a widget provided by Application Express and its interaction with "Device Details" widget illustrating types of location data returned by the Live Map and "Chart" application widgets according to an embodiment of the present invention.

Figure 6:
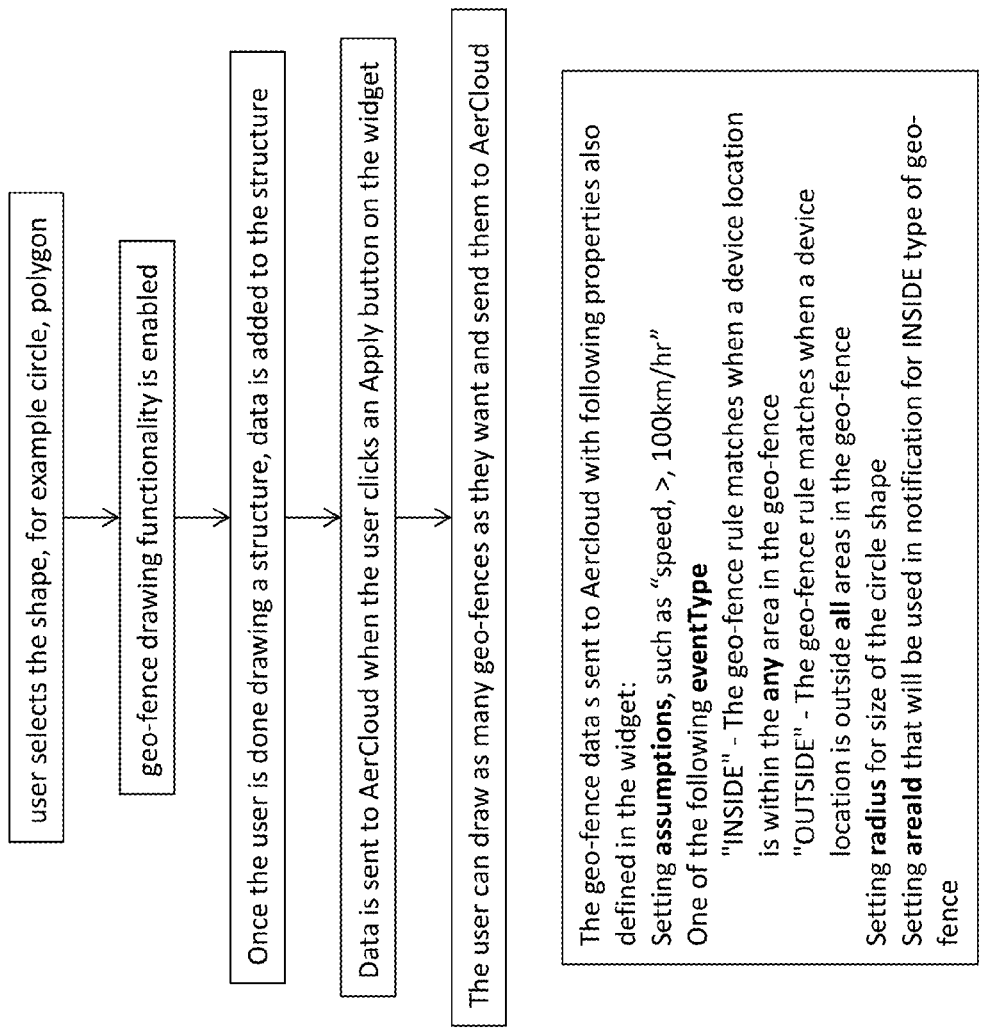
FIG. 6 is a flow diagram illustrating different steps involved in creating a user defined "geofence" according to an embodiment of the present invention.

FIG. 6 is a flow diagram illustrating different steps involved in creating a user defined "geofence" according to an embodiment of the present invention.

FIG. 7 illustrates an example of data structure that is sent to AerCloud according to an embodiment of the present invention.

Figure 8:
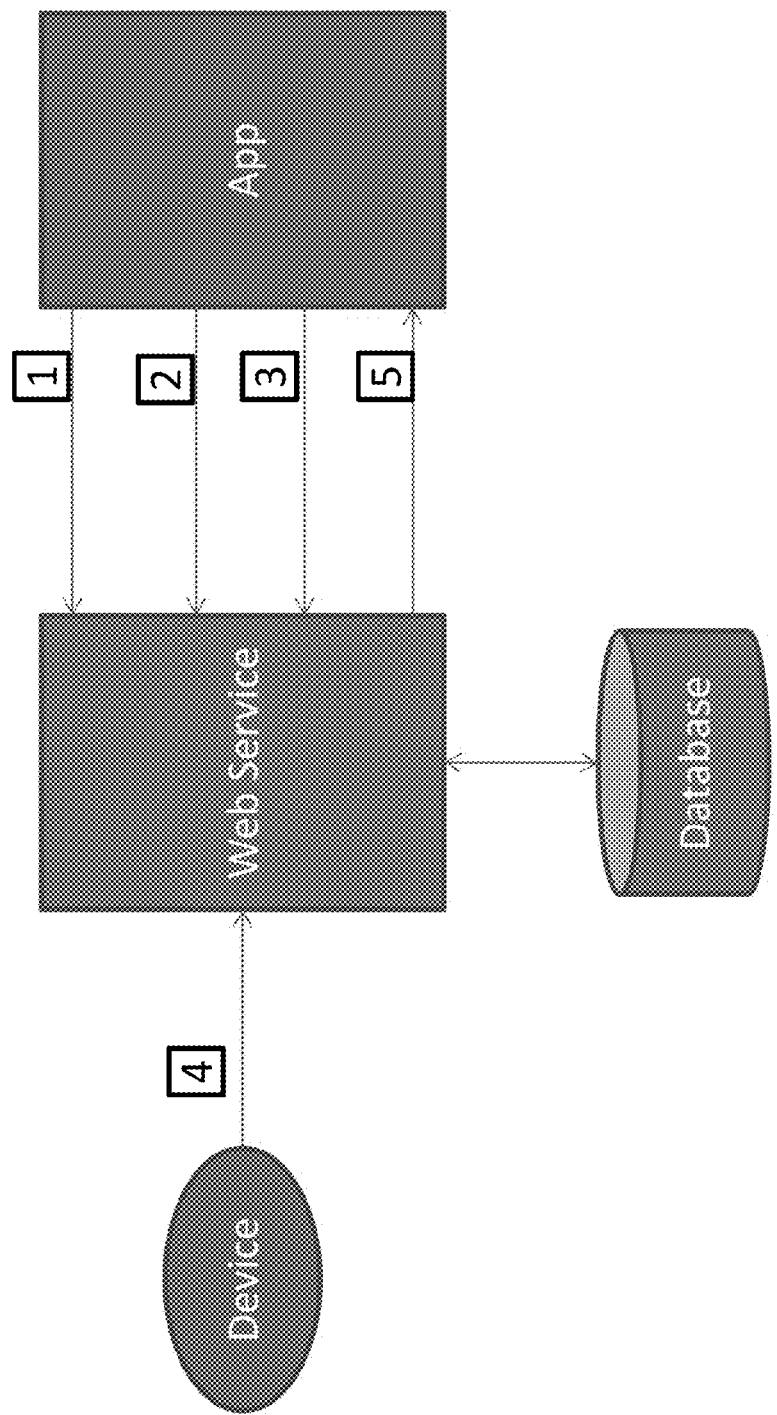
FIG. 8 illustrates an example of Geofence workflow according to an embodiment of the present invention.

FIG. 8 illustrates an example of Geofence workflow according to an embodiment of the present invention. Geofence is built on existing AerCloud concepts by allowing user to define location attributes and by using the user defined location attributes to configure and evaluate geofence parameters as described below. The application works by posting a data model with user-defined location attributes, which is saved in a database with a model id. It then posts a data container associated to the data model, which is saved in a database with a container id. A subscription is posted to the container with a geofence, which is saved in a database with a subscription id and its corresponding container id and device location data is posted to the container id. The web service component first reads the geofence associated with the subscription and the user-defined location attributes from the data model associated with the container. Then the web service extracts location from the device data using user-defined location attribute names. According to one embodiment, the location information is then used to evaluate the geofence rule.

FIG. 9 illustrates an example of Geofence configuration according to an embodiment of the present invention. A shown in FIG. 9, a geofence can contain multiple geographical areas but each area must be a valid GeoJSON object with some required properties such as "areaId" which is used for notifying INSIDE event type and "radius" which is required if the object type is Point. Its value is the radius of a circle in meters.

FIG. 10 illustrates an example of criteria for evaluating a Geofence according to an embodiment of the present invention. For Geofence "event type" "inside" the "trigger criteria" can be set as "The geofence rule is "true" if a device location is within any area defined in the fence, otherwise "false"." According to one embodiment, device data is sent to an application only if the geofence rule is evaluated to true. The data is decorated with the "area id" that triggered the fence. For Geofence "event type" "outside" the "trigger criteria" can be set as "The geofence rule is "true" if a device location is outside all area defined in the fence, otherwise "false"." Thus, according to one embodiment, device data is sent to the application only if the geofence rule is evaluated to true.

FIG. 11 illustrates an example of user defined location attributes according to an embodiment of the present invention. According to such an embodiment, user defined location attributes includes normalizing the data model definition using the "metadata" field. For example, for "normalized property", the description can be "LOC_LAT", "LOC_LON" and/or "LOC_ALT". "LOC_LAT" indicates that this data model parameter designates latitude. Default is "latitude". "LOC_LON" indicates that this data model parameter designates longitude. Default is "longitude" and "LOG_ALT" indicates that this data model parameter designates altitude. Default is "altitude".

For example, according to one embodiment,

```
{
  "id" : "myDeviceDataModel_1",
  "sclDataSchema" : {
    "id" : "mySchema_1",
    "encoding" : "JSON",
    "parameters" : [ {
      "name" : "deviceLatitude",
      "type" : "STRING",
      "isIndexed" : false,
      "metainfo" : {
        "uom" : "degree",
        "normalizedProperty" : "LOC_LAT"
      }
    }, {
      "name" : "deviceLongitude",
      "type" : "STRING",
      "isIndexed" : false,
      "metainfo" : {
        "uom" : "degree",
        "normalizedProperty" : "LOC_LON"
      }
    }, {
      "name" : "deviceAltitude",
      "type" : "STRING",
      "isIndexed" : false,
      "metainfo" : {
        "uom" : "degree",
        "normalizedProperty" : "LOC_ALT"
      }
    } ]
  }
}
```

Figure 12:
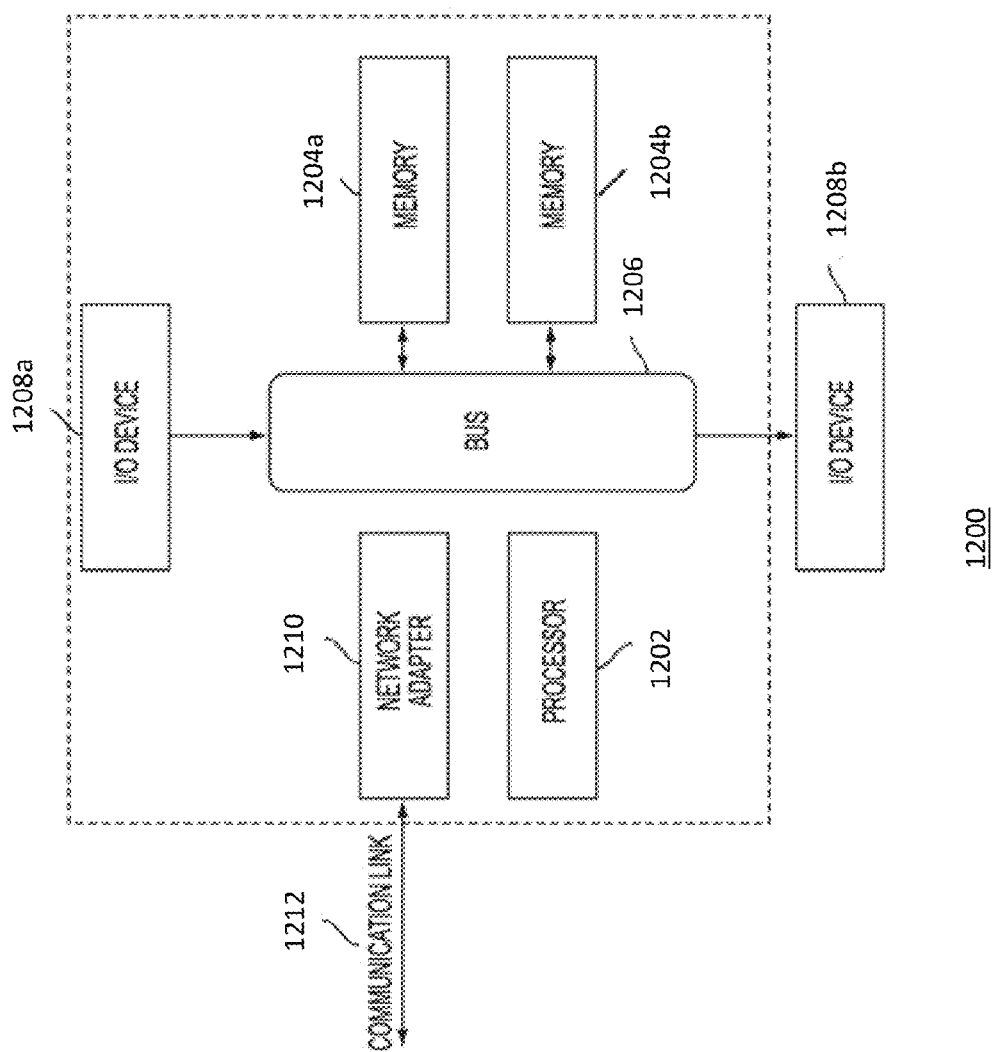
FIG. 12 illustrates a data processing system 1200 suitable for storing the computer program product and/or executing program code relating to the choices of the users in accordance with an embodiment of the present invention.

FIG. 12 illustrates a data processing system 1200, including an M2M device, suitable for storing the computer program product and/or executing program code in accordance with an embodiment of the present invention. The data processing system 1200 includes a processor 1202 coupled to memory elements 1204a-b through a system bus 1206. In other embodiments, the data processing system 1200 may include more than one processor and each processor may be coupled directly or indirectly to one or more memory elements through a system bus.

Memory elements 1204a-b can include local memory employed during actual execution of the program code, bulk storage, and cache memories that provide temporary storage of at least some program code in order to reduce the number of times the code must be retrieved from bulk storage during execution. As shown, input/output or I/O devices 1208a-b (including, but not limited to, keyboards, displays, pointing devices, etc.) are coupled to the data processing system 1200. I/O devices 1208a-b may be coupled to the data processing system 1200 directly or indirectly through intervening I/O controllers (not shown).

In FIG. 12, a network adapter 1210 is coupled to the data processing system 1202 to enable data processing system 1202 to become coupled to other data processing systems or remote printers or storage devices through communication link 1212. Communication link 1212 can be a private or public network. Modems, cable modems, and Ethernet cards are just a few of the currently available types of network adapters.

Embodiments described herein can take the form of an entirely hardware implementation, an entirely software implementation, or an implementation containing both hardware and software elements. Embodiments may be implemented in software, which includes, but is not limited to, application software, firmware, resident software, microcode, etc.

The steps described herein may be implemented using any suitable controller or processor, and software application, which may be stored on any suitable storage location or computer-readable medium. The software application provides instructions that enable the processor to cause the receiver to perform the functions described herein.

Furthermore, embodiments may take the form of a computer program product accessible from a computer-usable or computer-readable medium providing program code for use by or in connection with a computer or any instruction execution system. For the purposes of this description, a computer-usable or computer-readable medium can be any apparatus that can contain, store, communicate, propagate, or transport the program for use by or in connection with the instruction execution system, apparatus, or device.

The medium may be an electronic, magnetic, optical, electromagnetic, infrared, semiconductor system (or apparatus or device), or a propagation medium. Examples of a computer-readable medium include a semiconductor or solid state memory, magnetic tape, a removable computer diskette, a random access memory (RAM), a read-only memory (ROM), a rigid magnetic disk, and an optical disk. Current examples of optical disks include digital versatile disk (DVD), compact disk-read-only memory (CD-ROM), and compact disk—read/write (CD-R/R/W).

Any theory, mechanism of operation, proof, or finding stated herein is meant to further enhance understanding of the present invention and is not intended to make the present invention in any way dependent upon such theory, mechanism of operation, proof, or finding. It should be understood that while the use of the word preferable, preferably or preferred in the description above indicates that the feature so described may be more desirable, it nonetheless may not be necessary and embodiments lacking the same may be contemplated as within the scope of the invention, that scope being defined by the claims that follow.

As used herein the terms product, device, appliance, terminal, remote device, wireless asset. etc. are intended to be inclusive, interchangeable, and/or synonymous with one another and other similar communication-based equipment for purposes of the present invention though one will recognize that functionally each may have unique characteristics, functions and/or operations which may be specific to its individual capabilities and/or deployment.

As used herein the term M2M communication is understood to include methods of utilizing various connected computing devices, servers, clusters of servers, wired and/or wirelessly, which provide a networked infrastructure to deliver computing, processing and storage capacity as services where a user typically accesses applications through a connected means such as but not limited to a web browser, terminal, mobile application or similar while the primary software and data are stored on servers or locations apart from the devices.

Similarly, it is envisioned by the present invention that the term communications network includes communications across a network (such as that of a M2M but not limited thereto) using one or more communication architectures, methods, and networks, including but not limited to: Code Division Multiple Access (CDMA), Global System for Mobile Communications (GSM) ("GSM" is a trademark of the GSM Association), Universal Mobile Telecommunications System (UMTS), Long Term Evolution (LTE), fourth generation cellular systems (4G) LTE, wireless local area network (WLAN), and one or more wired networks.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method, comprising:
    receiving, by an application controller executing on one or more first virtual machines of a cloud computing platform and from a development environment executing on a client device, an M2M application, the M2M application being compatible with a runtime environment available from the cloud computing platform;
    submitting, by the application controller and to a service provider executing on one or more second virtual machines of the cloud computing platform, a request for geographic area data;
    receiving geographic area data from the service provider;
    receiving, from the development environment executing on the client device, a user selection of a particular geographic area included in the received geographic area data;
    binding, by the application controller, the selected geographic area to the M2M application; and
    packaging, by the application controller, the edited M2M application into an M2M application deployment package,
        wherein the M2M application evaluates one or more parameters based on predetermined criteria in relation to the selected geographic area for a plurality of M2M devices and issues alerts if one or more of the plurality of M2M devices are performing outside the predetermined criteria for the one or more parameters for the selected geographic area.

2. The method of claim 1, wherein the M2M application is communicatively coupled to the plurality of M2M devices through an M2M network.

3. The method of claim 2, wherein each M2M device includes a processor having limited logic, a memory, a communications adapter in communication with the M2M network and a sensor.

4. The method of claim 3, wherein the M2M application receives real-time data from the plurality of M2M devices through the M2M network.

5. The method of claim 3, where at least one M2M device from among the plurality of M2M devices includes sufficient onboard application logic to process real-time data and determine whether certain parameters triggering an action have been met.

6. The method of claim 2, wherein the triggering action includes forwarding the real-time data to the M2M application.

7. The method of claim 1, wherein the M2M application includes a web application.

8. A computer-implemented system comprising:
a processor, and
a memory in communication with the processor wherein the memory containing program instructions which when executed by the processor, perform the following operations comprising:
receiving an M2M application, the M2M application being compatible with a runtime environment available from a cloud computing platform;
submitting a request for geographic area data to a service provider;
receiving geographic area data from the service provider,
receiving a user selection of a particular geographic area included in the received geographic area data;
binding the selected geographic area to the M2M application; and
packaging the edited M2M application into an M2M application deployment package,
wherein the M2M application evaluates one or more parameters based on predetermined criteria in relation to the selected geographic area for a plurality of M2M devices and issues alerts if one or more of the plurality of M2M devices are performing outside the predetermined criteria for the one or more parameters for the selected geographic area.

9. The system of claim 8, wherein the M2M application is communicatively coupled to the plurality of M2M devices through an M2M network.

10. The system of claim 9, wherein the M2M network includes at least one of wired communications and wireless communications.

11. The system of claim 9, wherein each M2M device includes a processor having limited logic, a memory, a communications adapter in communication with the M2M network and a sensor.

12. The system of claim 9, wherein the M2M application receives real-time data from the plurality of M2M devices through the M2M network.

13. The system of claim 12, where at least one M2M device from among the plurality of M2M devices includes sufficient onboard application logic to process real-time data and determine whether certain parameters triggering an action have been met.

14. The system of claim 13, wherein the triggering action includes forwarding the real-time data to the M2M application.

15. A computer program product embodied on a non-transitory computer readable medium, comprising computer code which when executed by a computer causes the computer to perform a method comprising:
receiving the M2M application being compatible with a runtime environment available from a cloud computing platform;
submitting a request for geographic area data to a service provider;
receiving geographic area data from the service provider,
receiving a user selection of a particular geographic area included in the received geographic area data;
binding the selected geographic area to the M2M application; and
packaging the edited M2M application into an M2M application deployment package,
wherein the M2M application evaluates one or more parameters based on predetermined criteria in relation to the selected geographic area for a plurality of M2M devices and issues alerts if one or more of the plurality of M2M devices are performing outside the predetermined criteria for the one or more parameters for the selected geographic area.

16. The computer-readable medium of claim 15, wherein the M2M application is communicatively coupled to the plurality of M2M devices through an M2M network.

17. The computer-readable medium of claim 16, wherein the M2M network includes at least one of wired communications and wireless communications.

18. The computer-readable medium of claim 17, wherein the wireless communications include at least one of WiFi communications and cellular communications.

19. The computer-readable medium of claim 16, wherein each M2M device includes a processor having limited logic, a memory, a communications adapter in communication with the M2M network and a sensor.

20. The computer-readable medium of claim 15, wherein the M2M application includes a web application.

\* \* \* \* \*